United States Patent [19]

Martin

[11] Patent Number: 4,474,722
[45] Date of Patent: Oct. 2, 1984

[54] METHOD OF MAKING HARD SURFACE STYLING MODELS

[76] Inventor: Ronald C. Martin, 4634 Ashburton Pl., Sterling Heights, Mich.

[21] Appl. No.: 544,032

[22] Filed: Oct. 24, 1983

[51] Int. Cl.³ .............................................. B29C 1/02
[52] U.S. Cl. .................................. 264/219; 156/264; 156/266; 264/221; 264/226; 264/DIG. 6
[58] Field of Search ............... 264/139, 219, 221, 226, 264/317, DIG. 6; 156/153, 154, 264, 266

[56] References Cited

U.S. PATENT DOCUMENTS

| | | | |
|---|---|---|---|
| 3,556,886 | 1/1971 | Reusser | 156/264 |
| 3,629,388 | 12/1971 | Wolf et al. | 264/219 |
| 3,685,110 | 8/1972 | Randolph, Jr. | 156/264 |
| 3,788,372 | 1/1974 | Terenzoni | 156/264 |
| 4,262,717 | 4/1981 | Kohn | 156/264 |
| 4,401,496 | 8/1983 | Koontz, Jr. | 156/266 |

Primary Examiner—John E. Kittle
Assistant Examiner—Willie Thompson
Attorney, Agent, or Firm—Cullen, Sloman, Cantor, Grauer, Scott & Rutherford

[57] ABSTRACT

A method of making hard surface prototypes or styling concept models by assembling a contoured polystyrene foam pattern and applying an epoxy clay-like material in two steps to replace the surface of the polystyrene foam pattern. The polystyrene foam pattern is first assembled from blocks cut out to design drawing specifications. The pattern is then shaped to the design contour. The surface of the pattern is then grooved and the grooves filled with the epoxy clay. The remainder of the pattern surface is then removed and replaced by more epoxy clay which is then sanded and finished with paint and suitable trim pieces.

19 Claims, 9 Drawing Figures

METHOD OF MAKING HARD SURFACE STYLING MODELS

TECHNICAL FIELD

The present invention relates to a method of making hard surface prototype models that are suitable for final finishing and receiving trim pieces.

BACKGROUND OF THE INVENTION

The conventional method of making automobile styling models is to first sculpt the concept body in modeler's clay. Skilled industrial sculptors receive verbal instructions and work from body prints and drawings of the concept vehicle to transform the two dimensional renderings into a full-size three dimensional model. Modeling clay has long been used for its ability to be worked and reworked until the desired concept design is achieved. The ability to rework the styling clay is an important advantage, however, it also permits substantial variations from the initial concept to be incorporated in the final model. While a clay model may be studied to get a general idea of the design, it is still necessary to visualize the final appearance of the car without paint or trim.

Due to the tremendous investment required in developing a new automotive or other product design, it is preferable to be able to evaluate a new design as it will finally appear, complete with paint and trim. When a clay styling model is made it can not be painted or trimmed but must be used as a pattern for a plaster or plastic cast mold. After a mold of the clay model is formed, fiberglass is then cast in the mold to the shape of the original clay model. The fiberglass body is then removed from the mold and finished by painting and assembling final trim and glass to permit evaluation of the product in its final form. The above process typically takes from three to four months and is extremely costly. If the final model is not satisfactory it may be necessary to push back production plans to permit the preparation of another clay model and fiberglass casting.

One attempt at eliminating some of the problems in the conventional clay modeling method is known as the epowood process wherein plywood panels are attached to a welded steel frame. In the first step of the epowood process a plywood armature is assembled to precise specifications on a surface plate. Plastic cellular foam blocks are then bonded to the armature. Next, the blocks are covered with a thick layer of epowood material, an epoxy resin based material, and shaped to a rough body contour. The epowood material cures and then is marked with horizontal body lines transferred from the drawing by means of a plan view template which is positioned precisely on the surface plate. A vertical angle block having a router attached thereto at a height corresponding to the horizontal body line of the plan view section is then moved about the plan view template to form a groove in the epowood material. Making templates and grooving the epowood is repeated at vertically spaced intervals. An industrial sculptor then must carve the remaining eopwood material to connect the grooves. The model is then painted with a polyurethane paint and final trim is assembled to the model to complete the process.

While the epowood process represents a significant improvement in that it permits a direct process for making hard surface models, it is a laborious procedure requiring preparation of complete body line drawings and templates. The epowood must be initially sculpted into the rough form of the model and then resculpted to the exact shape as indicated by the grooves. The epowood process relies upon the use of a large and expensive surface plate to assure accuracy. Industrial sculptors are required in all phases of the process and the time required to manufacture a styling model is not significantly reduced as compared to the conventional clay styling model method. The epowood process is also subject to deviations from the initial design concept drawings due to the reliance on the industrial sculptor to convert from the two dimensional drawings to the styling model.

These and other problems have been solved by the method of the present invention.

BRIEF SUMMARY OF THE INVENTION

The present invention relates to a method of making hard surface styling models, or prototypes, of automobiles or other objects from a pattern of easily formed material, such as polystyrene foam or another similar material, which is styled to the design contour. A first portion of the pattern surface is cut away to a predetermined depth and is filled with a hardenable clay-like material while pliable. A second portion of the pattern surface remaining between the filled first portion is removed to a lesser depth than the first portion and filled with more of the hardenable clay-like material while pliable to a level slightly above the filled first portion to recreate the design contour. After the material in the second portion hardens, it is sanded to the surface of the filled first portion. The method provides a hard surface styling model suitable for "show car" quality finishing, attaching glass, hardware and trim so that the design can be evaluated in its finished form as an exact facsimile of the proposed product.

The method of making the pattern is improved according to one aspect of the present invention by forming the pattern from a plurality of pattern pieces having a predetermined thickness. One face of each piece is cut to correspond to a drawing body line, typically at 100 mm intervals. The other face of the pattern piece is cut to the same contour but extends substantially outwardly from the desired contour at its body position. First and second lateral faces of adjacent pattern pieces are glued together and preferably to a frame member, cube, or buck in a generally stepped configuration. The inset corners of adjacent assembled pattern pieces, which are cut to the desired body lines, may be marked or dyed to provide guidance as the surface is shaped to the design contour. The portions of the pattern pieces extending outwardly from the design contour are removed by carving, shaving or sanding those portions until a smooth, continuous surface is provided which interconnects the marked body lines and precisely forms the design contour.

The method of the present invention eliminates the need to provide a surface plate or other precision support equipment to produce an acceptably symmetrical and accurate concept model.

According to one feature of the present invention, spaces or slots between body panels, for example the slot formed between a door or the hood of a vehicle and their respective body openings, may be simulated by taping at the location of the desired slot and cutting grooves on both sides of the tape which are then filled as previously described. The strip of polystyrene foam between the two filled grooves is left intact under the tape until the remaining portions of the surface are complete. After the surface is complete, but prior to final finishing, the tape is removed and the underlying polystyrene foam may be simply dissolved by acetone leaving a precise and well-defined slot as it should appear in the final product.

Another feature of the present invention is the concept of cutting additional grooves which intersect critical styling regions. Grooves may be cut to extend radially from fender wells or across other feature lines where additional guidance is desirable to assure an accurate reproduction of the design drawings in the final model.

To provide guidance in shaping the clay-like material in the filled voids, the filled grooves may be dyed or coated with a pigmented primer to provide a benchmark to which the clay-like material in the voids is shaped. The dye is preferably a liquid vehicle primer that will encourage adhesion of the hardenable clay-like material in the filled voids to the similar hardened clay-like material in the filled grooves.

According to the present invention, the filled grooves are simply and accurately shaped to the desired design contour by simply packing the hardenable clay-like material into the grooves and shaping the material while in its pliable phase with a knife or spatula flush to the surface of the finished polystyrene foam to the desired body contour. In this way, the services of a skilled sculptor are only required to work with the polystyrene foam material to give the model its initial shape. After which the grooving and filling procedures may be performed by semi-skilled technicians who then follow the original contour.

These and other advantages of the present invention will be better understood upon studying the following detailed description in view of the attached drawings.

DETAILED DESCRIPTION OF A PREFERRED EMBODIMENT

Figure 1:
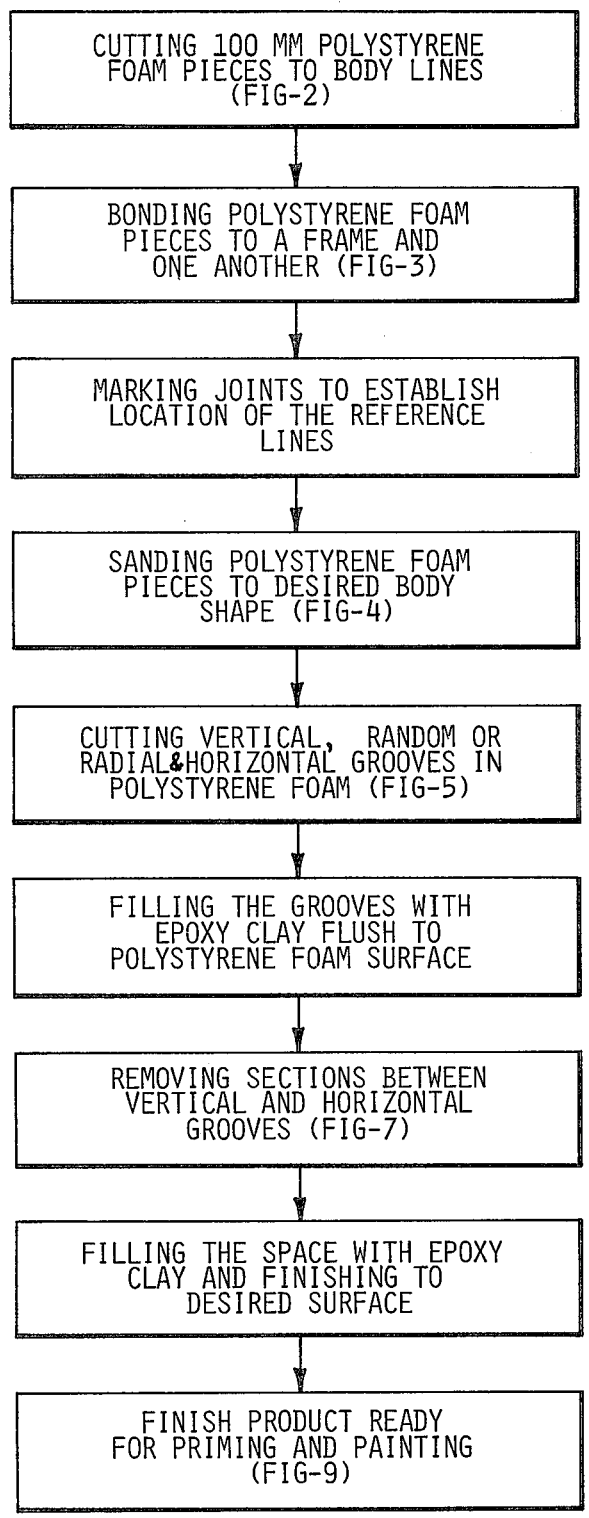
FIG. 1 is a block diagram showing the basic steps used in performing the method of making hard surface styling models.

Referring now to FIG. 1, the basic steps of the process are set forth in schematic form. The other figures are referenced on the schematic where appropriate to permit easy understanding of the preferred order of the steps. It should be understood that some of the steps may be supplemented with additional steps or that the order of some of the steps may be changed.

Figure 2:
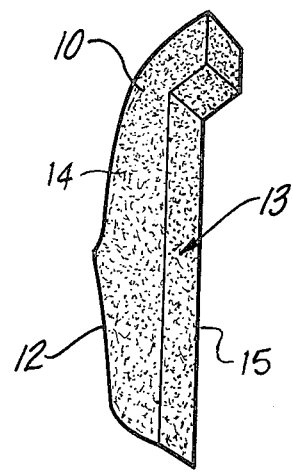
FIG. 2 is an inside perspective view of a pattern piece.

Referring now to FIG. 2, a polystyrene foam pattern piece 10 is shown to include a contoured side 12 which is cut by a band saw or similar tool to the shape prescribed on a cross-sectional view of a design drawing. A baseline side 13 is also cut in the pattern piece 10 generally on the side opposite the contour side 12. The baseline side 13 is provided to locate the pattern piece 10 vertically and horizontally with respect to other similar pattern pieces 10 and the base cube or buck 17. The pattern piece 10 includes a first lateral face 14 which corresponds to the cross-section of the design drawing at a prescribed point. The second lateral face 15 is spaced from the first lateral face 14 a predetermined distance, preferably 100 mm for automobile models since the automobile design drawings typically are specified at 100 mm intervals.

Figure 3:
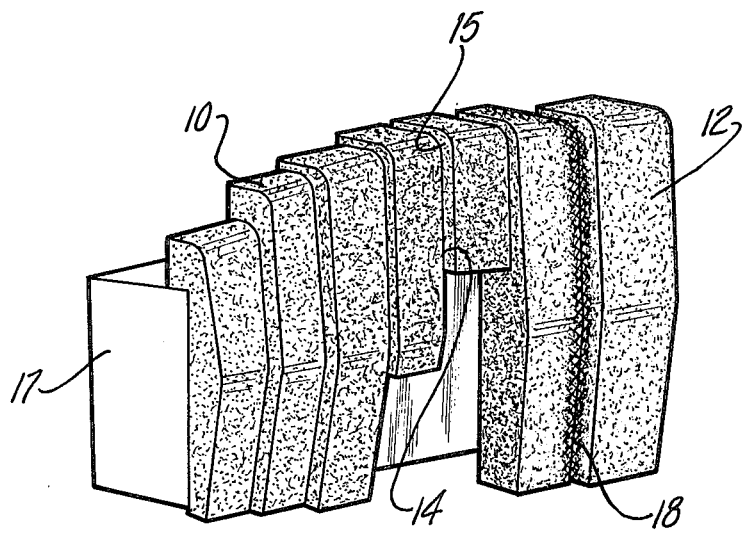
FIG. 3 is a perspective view of a series of pattern pieces assembled together and to a cube shaped buck.

As shown in FIG. 3, a plurality of pattern pieces 10 are secured together with first and second lateral faces 14 and 15 abutting the lateral faces of adjacent pattern pieces 10. The pattern pieces are preferably glued together and to the base cube or buck 17 which establishes the vertical, horizontal, fore and aft reference points for the model. While the first lateral face is cut precisely to the 100 mm body line of the drawing, the second lateral face 15 of each pattern piece 10 is substantially larger than the contour line of the drawing at the location 100 mm distant from the first lateral face 14. The second lateral face 15 is larger so that subsequent shaping operations will be material removal operations and will not require building up of the surface. If the first lateral face 14 is at a location where the body contour on both sides of the first lateral face 14 is smaller, the two pattern pieces 10 would be assembled with the first lateral faces 14 abutting one another.

Figure 4:
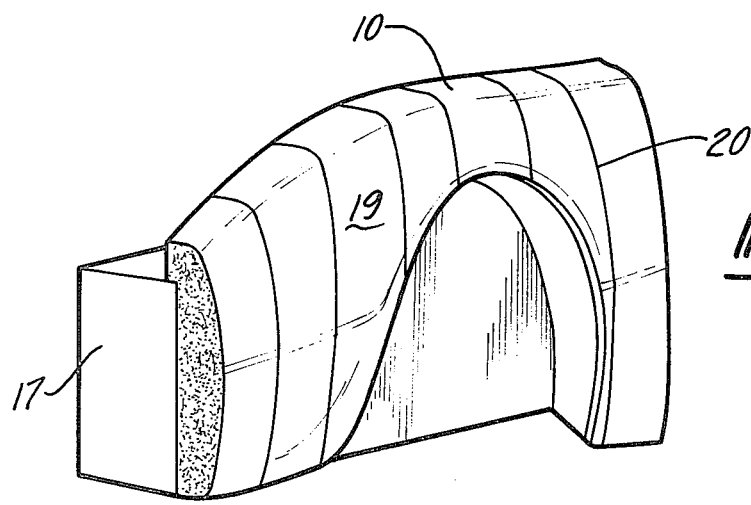
FIG. 4 is a perspective view of a pattern formed to the desired design contour surface.

As shown in FIG. 4, the stepped configuration illustrated in FIG. 3 is smoothed to a continuous contoured surface 19. To guide the shaping process dye 18 may be sprayed on the contoured side 12 at the corner formed with the first lateral face 14. The paint will initially appear to be a thick band but as the excess polystyrene foam is removed the thick band of dye is reduced until it appears as a thin line 20 corresponding precisely with the body lines on the design drawing. The shaping process is performed with a plane, file or sanding block. It should be noted that this process of shaping the contour surface 19 is easier than shaping clay since the polystyrene foam material is readily shaped to form the pattern 16.

Shaping the contour surface 19 also includes cutting out areas such as the wheel well shown in FIG. 4 by trimming, planing and/or sanding the area.

Once the contour surface 19 has been shaped to the final specification, grooves 21 are cut in intersecting arrangement spanning the entire contour surface 19. Additional, non-intersecting grooves 22 may be added in critical locations to better maintain the shape of the design where an intricate surface is specified.

While the illustrated embodiment has grooves 21 and 22 spanning the contour surface 19, the invention may also be practiced by removing a first portion, such as a series of shapes or circles, and leaving a second portion between or around the first portion. Therefore, it should be understood that the invention is intended to include more than models formed with grooves 21 and 22.

Figure 5:
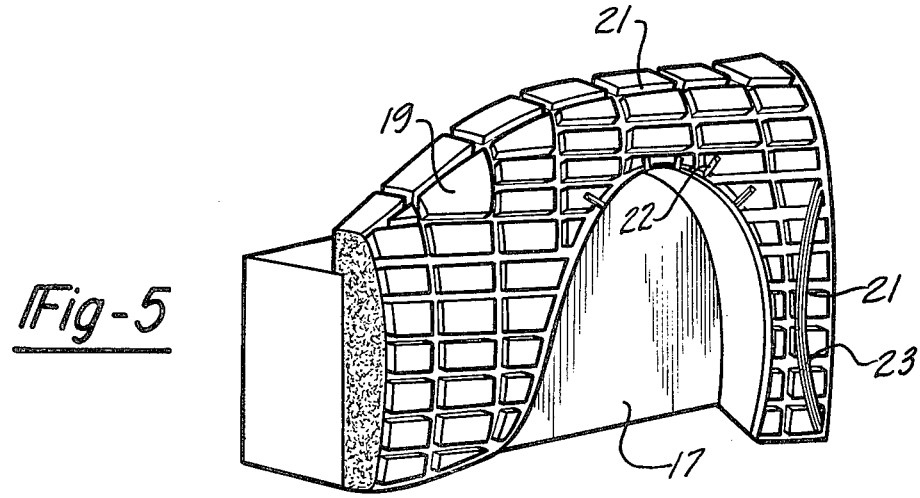
FIG. 5 is a perspective view of a pattern having a plurality of grooves carved therein.

Seams or spaces, such as those formed between a door and a door opening or between adjacent panels, may be easily included in the model by taping over the polystyrene foam prior to cutting the grooves 21 into the contour surface 19. Two grooves 21 are preferably cut on opposite sides of the tape line, as shown in FIG. 5, leaving a thin strip of polystyrene foam 23 intact under the tape line. This thin strip of polystyrene foam 23 will remain in place until after all of the remainder of the surface has been formed in hardenable clay-like material.

After the grooves 21 have been formed in the contour surface 20 they are filled with an epoxy resin clay formulated with glass microballoons. The epoxy clay composition is a hardenable clay-like material which is plastic or pliable that becomes hardened when cured. It should have a high degree of workability and generally the consistency of modeling clay when in its pliable phase prior to curing. The epoxy clay composition, or epoxy clay, is a viscous hardenable material that should be compounded to cure preferably in four to six hours which allows enough time to work batches of the material into the grooves. The epoxy clay is cured by the inclusion of a separate catalyst which is added to the composition just prior to applying the epoxy clay in the grooves. When the two parts of the epoxy clay are mixed together it forms a soft, dough-like material which cures as a result of its chemistry to a hard solid form with low shrinkage, dimensional stability and excellent toughness.

The epoxy clay preferably cures at room temperature and can be carved with wood working tools and sanded. It is dimensionally stable and highly resistant to thermal expansion and contraction.

The epoxy clay is permitted to harden after it is shaped to the precise contour of the surrounding polystyrene foam contoured surface 19 with a knife or spatula. After curing, the areas between the grooves are routed out to a predetermined depth to create voids 25 therebetween.

After all of the spaces or voids 25 between the filled grooves 24 have been formed, the filled grooves 24 project outwardly to form a positive grid. The filled grooves 24 are then coated with a pigmented epoxy primer which enhances the adhesion of the later applied epoxy clay to the filled grooves 24. The pigment in the epoxy primer should contrast with the color of the epoxy clay to act as a benchmark as the final surface is developed.

Figure 6:
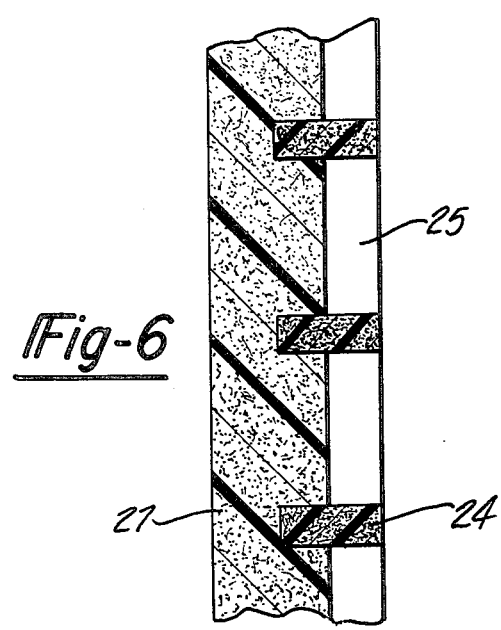
FIG. 6 is a cross-sectional view taken along the lines 6—6 in FIG. 7.
Figure 7:
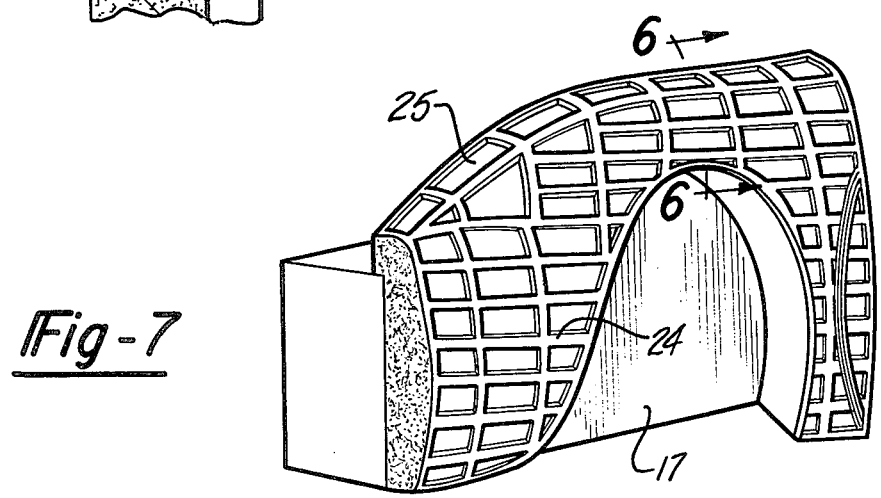
FIG. 7 is a perspective view of a front fender model with a layer of the pattern material between the filled grooves being removed to form voids.

As shown in FIG. 7, the filled grooves 24 appear as an upstanding rib after the contoured surface between the filled grooves 24 is removed. This may also be seen in FIG. 6 wherein the styrofoam substrate 27 may be seen in cross-section with the upstanding filled grooves 24, or ribs, extending therefrom with spaces therebetween.

Figure 8:
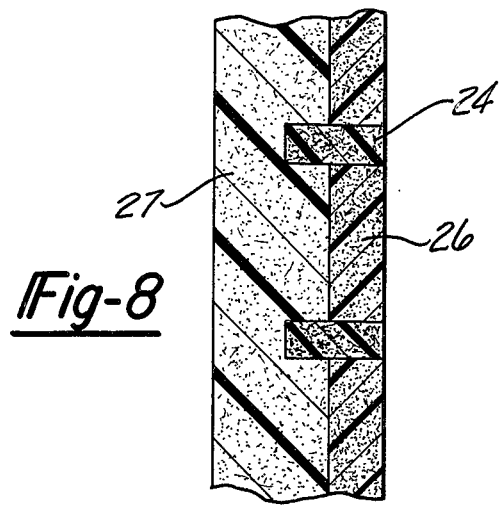
FIG. 8 is a cross-sectional view taken along the lines 8—8 in FIG. 9.

Filling the grooves is preferably performed by rolling the epoxy clay into strips of the desired thickness and packing the strips into the voids 25. The relationship of the filled grooves 24 and filled voids 26 can best be seen by reference to FIG. 8 wherein the polystyrene foam substrate 27 and the filled grooves 24 and filled voids 26 are shown in cross-section as they appear after finishing.

Figure 9:
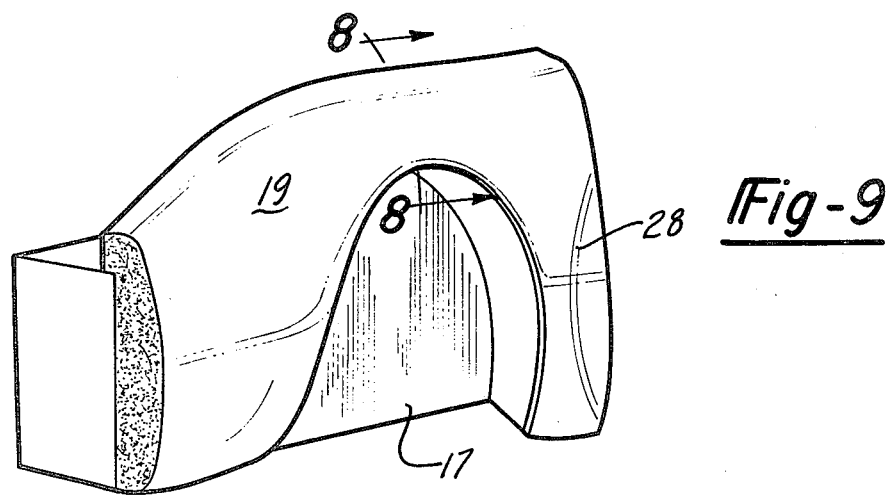
FIG. 9 is a perspective view of the finished hard surface styling model ready for priming and painting.

Referring now to FIG. 9, the finished hard surface styling model is shown. The filled voids 25 being sanded down to the desired surface wherein the pigmented epoxy primer that was previously applied to the filled grooves 24 begins to be removed by a sanding block passing thereover.

If any low areas are noted in the contour surface they may be filled with body filler prior to painting and final finishing as is well known in the art of auto body repair.

If a panel seam or body opening is desired the strip of polystyrene foam 23 that was not replaced between the two grooves on either side of the tape line may now be removed by applying a small amount of acetone which dissolves the polystyrene foam and leaves a sharp, well-defined seam or body opening 28, as shown in FIG. 9.

The hard surface styling model is now ready for its final priming and painting. Trim pieces, windows and various hardware may be attached to the hard surface styling model due to its high strength.

The hard surface styling model thus provided is unsurpassed in realism and is achieved with the minimum amount of sculpting and independent judgement being required to convert the two dimensional drawing to a three dimensional model. Much of the work may be performed by technicians who need not even consider the design drawings.

While a preferred embodiment of the invention has been described so as to enable one skilled in the art to practice the method of the present invention, the preceding description is intended to be exemplary and should not be used to limit the scope of the invention. The scope of the invention should be determined only by reference to the following claims.

What is claimed is:

1. A method of making styling models comprising the steps of:
    forming a pattern from an easily formed material to a desired design contour surface;
    cutting away a first portion of the pattern;
    filling the grooves substantially to the design contour surface with a hardenable clay-like material;
    removing a second portion of the pattern around the first portion to form voids; and
    filling the voids with another hardenable clay-like material substantially to the design contour surface.

2. The method of claim 1 after the step of filling the voids further comprising the step of shaping the hardenable clay-like material in the voids to the desired contour surface.

3. In the method of claim 2 further comprising the step of painting desired contour surface.

4. The method of claim 1 wherein the step of forming the pattern comprises:
    cutting pattern pieces of known thickness having first and second lateral faces to design contour specifications on a first face of the pattern pieces at intervals corresponding to the thickness of the pattern pieces;
    adhering the first and second lateral faces of adjacent pattern pieces together to form a rough pattern of generally stepped configuration; and
    removing substantially all portions of the rough pattern extending outwardly of the first faces of adjacent pattern pieces to form a smooth curved surface corresponding to the design contour.

5. In the method of claim 4 further comprising applying a pigmented substance to the pattern pieces at the corner formed by the intersection of the first face and the design contour to facilitate said step of removing the portion of the rough pattern.

6. The method of claim 1 wherein said step of cutting away the first portion comprises cutting a plurality of intersecting grooves substantially spanning the design contour surface.

7. The method of claim 6 wherein supplemental grooves are cut into the design contour surface across critical styling regions.

8. The method of claim 1 wherein said hardenable clay-like materials are an epoxy resin based material having microballoon means for filling and reinforcing the material and a catalyst which are mixed prior to application.

9. The method of claim 1 wherein the hardenable clay-like material in the first portion is painted after the voids are formed for providing a contour surface indicator when shaping the putty-like material in the voids and for providing a coating to which the other hardenable clay-like material may bond.

10. In the method of claim 3 further comprising the step of filling any unwanted recesses in the contour surface with a filler material prior to painting the contour surface.

11. A method of forming a pattern comprising:
cutting pattern pieces of known thickness having first and second lateral faces to design contour specifications on a first face of the pattern pieces at intervals corresponding to the thickness of the pattern pieces;
adhering the first and second lateral faces of adjacent pattern pieces together to form a rough pattern of generally stepped configuration; and
removing substantially all portions of the rough pattern extending outwardly of the first faces of adjacent pattern pieces to form a smooth curved surface corresponding to the design contour.

12. In the method of claim 11 further comprising applying a pigmented substance to the pattern pieces at the corner formed by the intersection of the first face and the design contour to facilitate said step of removing the portions of the rough pattern.

13. A method of making styling models comprising the steps of:
cutting pattern pieces from an easily formed material;
gluing the pattern pieces together and attaching said pattern pieces to an armature;
shaping the pattern pieces to form a pattern having a desired design contour;
forming a plurality of grooves in the pattern;
filling the grooves with a first hardenable viscous material and allowing the first viscous material to harden;
removing a layer of the pattern from between each of the grooves to form a plurality of shallow voids therebetween;
filling the voids with a second hardenable viscous material and allowing the second viscous material to harden; and
shaping the first and second hardenable viscous materials to the design contour.

14. In the method of claim 13 further comprising the step of painting the desired contour surface.

15. The method of claim 13 wherein said step of cutting grooves comprises cutting a plurality of intersecting grooves spanning the entire design contour surface.

16. The method of claim 15 wherein supplemental grooves are cut into the design contour surface at critical styling regions.

17. The method of claim 13 wherein the first and second hardenable viscous material is an epoxy resin based material with glass particles intermixed in the material and a catalyst which are mixed prior to application.

18. The method of claim 13 wherein the hardened viscous material in the grooves is painted after the voids are formed for providing a contour surface indicator when shaping the viscous material in the voids and for providing a coating to which the other hardenable viscous material may bond.

19. In the method of claim 14 further comprising the step of filling any unwanted recesses in the contour surface with a filler material prior to painting the contour surface.

* * * * *